W. ERNST
MOTOR BRACKET
June 5, 1928.
Re. 16,988
Original Filed May 8, 1926
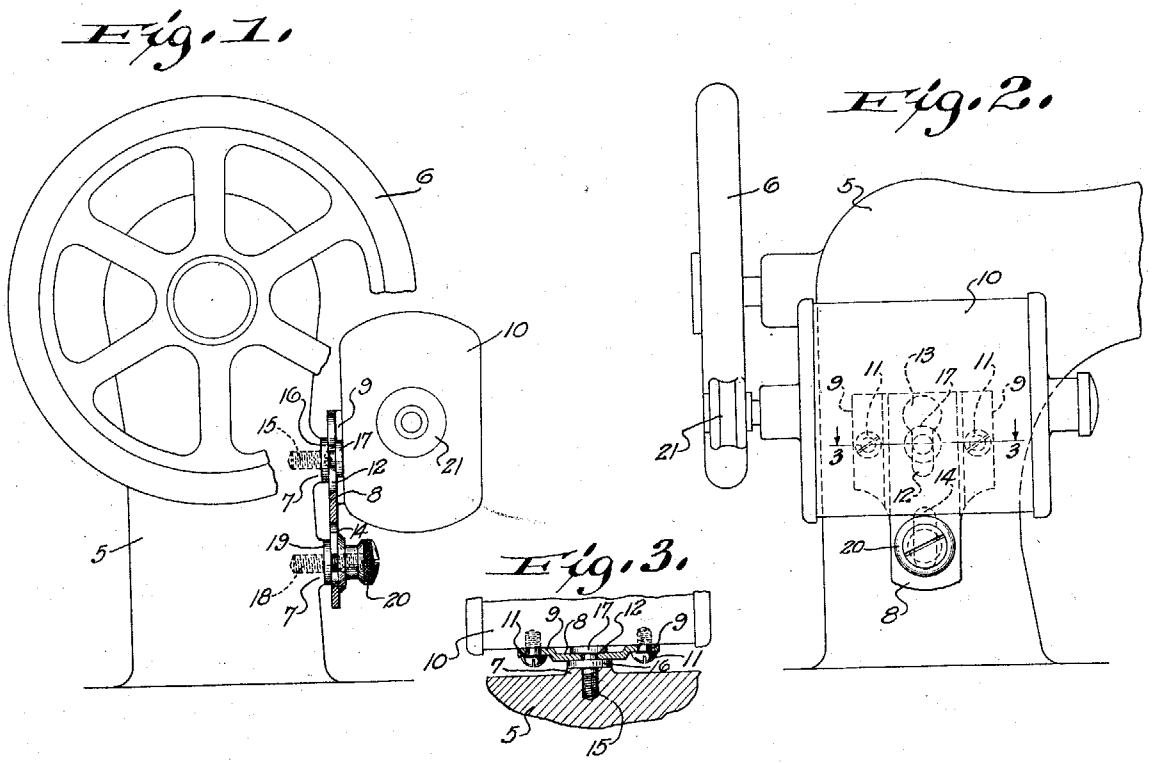
INVENTOR.
William Ernst.
BY
Morsell, Keeney & Morsell
ATTORNEYS.

Reissued June 5, 1928.

Re. 16,988

UNITED STATES PATENT OFFICE.

WILLIAM ERNST, OF RACINE, WISCONSIN, ASSIGNOR TO HAMILTON BEACH MFG. CO., OF RACINE, WISCONSIN, A CORPORATION OF WISCONSIN.

MOTOR BRACKET.

Original No. 1,611,900, dated December 28, 1926, Serial No. 107,727, filed May 8, 1926. Application for reissue filed December 7, 1927. Serial No. 238,445.

This invention relates to improvements in motor brackets, particularly adapted for attachment to sewing machine heads to secure electric motors thereto for hand wheel driving.

It is one of the objects of the present invention to provide a rigidly mounted motor bracket for sewing machine heads arranged so that the motor may be vertically adjusted with respect to the machine hand wheel.

A further object of the invention is to provide a vertically adjustable motor carrying bracket which may be locked or clamped in any adjusted position.

A further object of the invention is to provide an adjustable motor bracket of the class described adapted for mounting on the side portion of a sewing machine head.

A further object of the invention is to provide a motor bracket of the class described which is of very simple construction, is easily manipulated, is strong and durable, and is well adapted for the purpose described.

With the above and other objects in view the invention consists of the improved motor bracket and its parts and combinations as set forth in the claims and all equivalents thereof.

In the accompanying drawing in which the same reference characters indicate the same parts in all of the views:

Figure 1 is an end view of a sewing machine head having secured thereto the improved motor bracket holding a motor in adjusted relation with respect to the hand wheel;

Figure 2 is a side view thereof; and

Figure 3 is a sectional view taken on line 3—3 of Figure 2.

Referring now more particularly to the drawing it will be seen that the numeral 5 indicates a sewing machine head having revolubly mounted at its end a hand wheel 6.

The side portion of the head has cast and milled thereon in vertical alinement, a pair of flattened projecting portions 7. Adapted to be slidably secured against said portions is a bracket or plate member 8 which, at its upper side portions is formed with outwardly off-set portions 9 to engage the inner face of an electric motor 10, the motor being held thereto by screws 11.

Formed in the medial upper portion of the plate member 8 is a vertical slot 12, enlarged and rounded at 13 and below the slot 12 is an elongated slot 14.

The plate member 8 is secured against the upper shoulder 7 by means of a threaded stud 15 which extends through the slot 12 and is threaded into the head member. Said stud is formed with a pair of spaced apart head or enlarged portions 16 and 17, one on each side of the plate member and the outer portion 17 is sufficiently small to permit its passage through the enlarged portion 13 of the slot 12.

The plate member 8 is also held against the lower shoulder portion 7 by means of a threaded stud 18, threaded into the head and extending outwardly through the slot 14 in said plate member. Said stud has an integral head portion 19 adapted to engage the inner face of the plate member. A cap member 20 is threaded onto the outer end portion of said stud.

By reason of the arrangement described when the cap member 20 is unthreaded the plate member is free to be moved vertically on the studs 15 and 18 accommodated by the slots 12 and 14. In the normal position shown in the drawing the bracket is so adjusted that the pulley wheel 21 of the motor will be in close contact with the rim of the hand wheel to drive the same and the bracket is held in adjusted position by tightening the cap member 20 which clamps the plate member unmovably between the stud portion 19 and the cap. Obviously, the bracket may be lowered to a position wherein the pulley wheel is disengaged from the hand wheel. In this position bobbins may be readily wound. Also, it is possible to entirely remove the bracket from the head by lowering it to its lowermost position and removing the cap 20 from its stud. The plate may then be removed from both studs as the portion 17 of the upper stud will pass through the slot enlargement 13.

From the foregoing, it will be manifest that the purpose of the enlargement 13 of the slot 12 is to permit the passage of the portion 17 of the stud 15 through said enlarged opening, and that when the plate and motor are raised to desired position, the plate 8 at the sides of the slot 12 will be engaged between the portions 16 and 17 of the stud 15 and held closely to the machine head, as intended. Obviously the enlarged portion 13 could be dispensed with and slot 12 continued upwardly to the top edge of the plate 8. The plate would then be passed upwardly (the stud 15 entering through the open end of the slot 12), between the parts 16 and 17 to be engaged thereby when in its intended position, just as efficiently as if the stud had been entered through the enlarged opening 13. The construction could be further simplified by combining the slots 12 and 14, if desired, although the form of construction shown is more rigid and therefore preferable.

From the foregoing description it will be seen that the improved motor bracket is of very simple and novel construction, and is well adapted for the purpose set forth.

I claim as my invention:

1. The combination with a sewing machine head having a hand wheel, of a plate member formed with a pair of slots, one of said slots having an enlarged portion, studs extending from the head through the slots of said plate member, one of said studs having a head, the plate member being movable vertically with respect to said studs, a motor carried by said plate member, and a cap member removably engaging one of the studs and the plate to clamp the latter in an immovable adjusted position, the removal of the cap member permitting a movement of the plate whereby the headed stud may pass through the enlarged portion of said slot to effect the entire removal of the plate.

2. The combination with a sewing machine head formed with a pair of shouldered portions on the side thereof, of a hand wheel, a slotted vertically positioned plate member, studs extending from said shouldered portions through the slots of said plate member, the plate member being removable from said studs and also being movable vertically with respect thereto, a motor carried by said plate member for driving said hand wheel, and a cap member engaging one of the studs and the plate member to clamp the latter in an immovable adjusted position.

3. The combination with a sewing machine head, a hand wheel and a motor, of a motor bracket comprising a slotted vertically positioned plate member, a pair of studs extending from the sewing machine head in vertical alignment through the slotted plate member, the plate member being removable from the studs and also bodily movable vertically with respect thereto, and a cap member removably engaging one of the studs and the plate member to clamp the latter in immovable, adjusted position.

4. The combination with a sewing machine head, a hand wheel and a motor, of a motor bracket comprising a vertically disposed slotted plate member bent to provide motor and head engaging members in different vertical planes, a stud in the machine head having enlarged portions at its free end for engagement with the plate member, a second stud, and a removable cap for engaging same and the plate member to clamp the latter in immovable, adjusted position.

In testimony, that I claim the foregoing as my invention, I affix my signature this 28 day of November, 1927.

WILLIAM ERNST.